United States Patent

[11] 3,542,209

[72] Inventor Howard Thompson
 7520 Wayzato Blvd., Minneapolis,
 Minnesota 55416
[21] Appl. No. 719,091
[22] Filed April 5, 1968
[45] Patented Nov. 24, 1970

[54] NUT TOOL RACK
 7 Claims, 3 Drawing Figs.
[52] U.S. Cl. .................................................. 211/60,
 248/205
[51] Int. Cl. ..................................................... A47f 7/00
[50] Field of Search ........................................... 211/60, 86;
 248/205

[56] References Cited
 UNITED STATES PATENTS
 1,130,882  3/1915  Bohlman ...................... 248/205
 1,323,924  12/1919 Stevens ........................ 248/205
 1,392,134  9/1921  Farber .......................... 211/60
 1,969,220  8/1934  Ingram ......................... 211/60

Primary Examiner—James A. Leppink
Attorney—Richard P. Schulze

ABSTRACT: A nut tool rack for removable attachment to a receptacle having a rim. The rack comprises a lateral arm having at one end a plurality of apertures for holding the nut cracking and picking tools and at its other end a hook member for engaging the bowl rim and having a depending leg for engaging an inner wall portion of the bowl to maintain lateral position of the rack. The apertures are formed to hold the tools in fixed upright position.

Patented Nov. 24, 1970 3,542,209
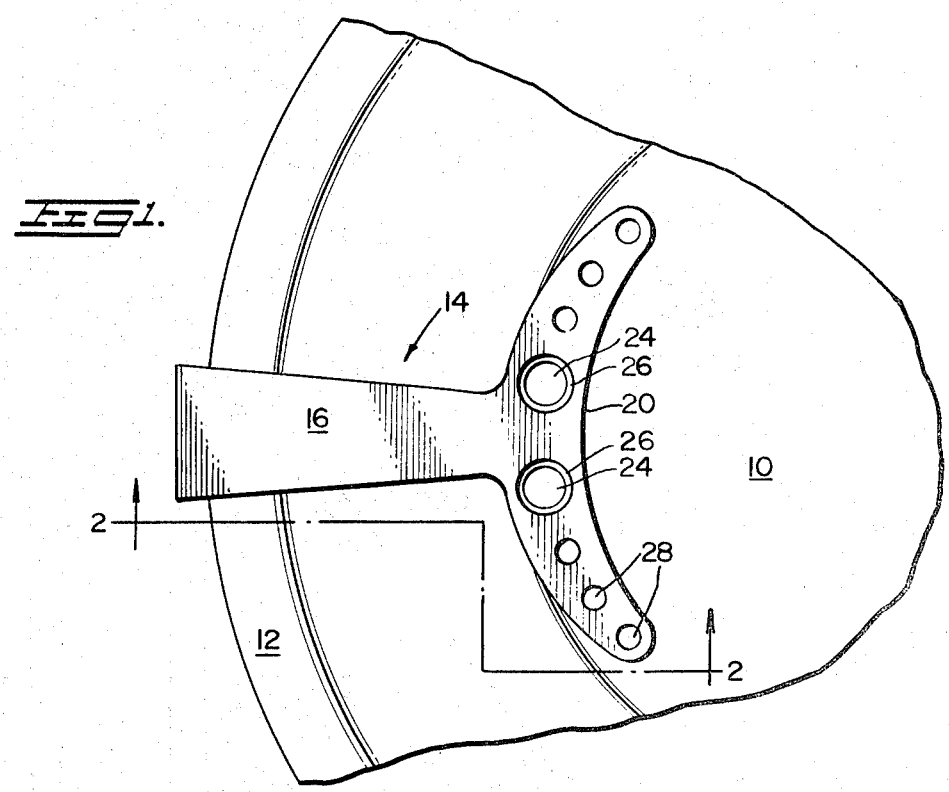
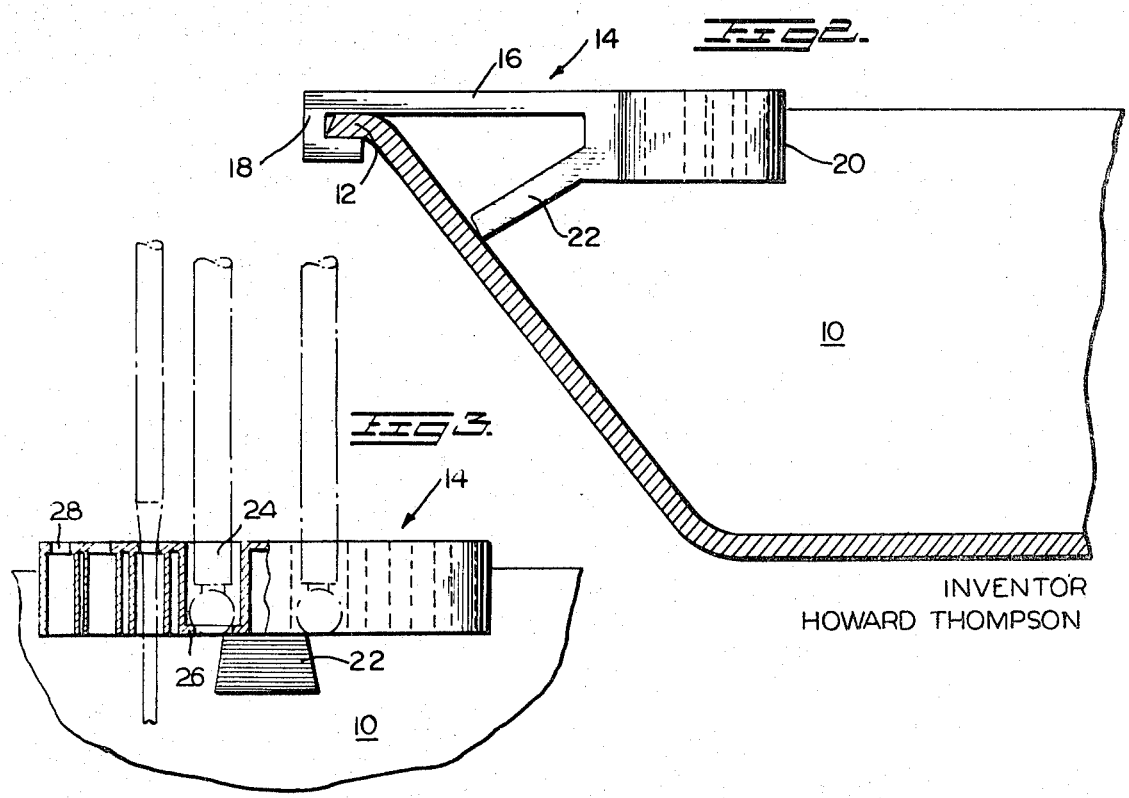
INVENTOR
HOWARD THOMPSON

NUT TOOL RACK

The present invention relates to improvements in nut tool racks and also contemplates the combination of the improved nut tool rack with a bowllike receptacle for a supply of nuts or the like.

A principal object of the invention is to provide a nut tool rack which is readily attachable to and detachable from a bowl so that when desired the bowl may be adapted for other uses.

Another object is to provide a nut tool rack which is adapted for attachment to bowls of any size or configuration so long as the bowls or other containers have an outer peripheral rim or equivalent means necessary partially to support the rack.

Another object is to provide a nut tool rack having apertured supporting means for the nut tools of novel configuration whereby the nut crackers and picks are held firmly in upright position without tendency to wobble or rattle.

Other objects and advantages will be apparent from the following detailed description taken in conjunction with the accompanying drawings wherein a preferred embodiment of the principles of the invention has been selected for exemplification.

In the drawings:

FIG. 1 is a top plan view of a nut tool rack constructed in accordance with the invention shown attached in operative position to a bowl indicated in fragment;

FIG. 2 is a view taken on the line 2-2 of FIG. 1 showing the nut tool rack in side elevation; and FIG. 3 is an inner end view partly in vertical section to show the configuration of the nut tool supporting apertures.

Referring more particularly to the drawings, wherein like numerals refer to like parts, the bowl indicated at 10 may be of any kind, size or configuration but preferably having an outer peripheral rim or the like 12 partially to support the rack in operative position upon the bowl. Particularly well adapted to the invention is the bowl of my U.S. Pat. No. 2,592,080 and the bowl of my copending U.S. Pat. application Ser. No. 592,606, filed Nov. 7, 1966, now abandoned.

The nut bowl tool rack, indicated in its entirety at 14, comprises an arm or cross member 16 having at its outer end a U-shaped hanger or hook member 18, preferably in the form of the reversely bent portion as illustrated in FIG. 2, for engagement with the bowl rim as shown. Carried at the inner end portion of the arm 16 is the nut tool holder 20 to be further described. The leg 22 depends downwardly and outwardly of the holder 20 for engagement with an inner side wall portion of the bowl 10 to support the rack 14 transversely of the bowl or in horizontal position. Preferably the parts 16, 18, 20 and 22 may be integrally formed in a single molding operation or selected parts may be separately molded and integrally attached together.

It will be apparent that the rack 14 is adapted to be attached to bowls or the like of various sizes in balanced operative position and is readily removable to free the bowl for other uses whenever desired.

The holder 20 includes a pair of central apertures 24 for receiving the handle ends of a nut cracker indicated in broken lines, the end extremities of which are supported by the restricting annular shoulders 26 at the bottom of the apertures 24. Of course, several pairs of apertures 24 may be provided for a plurality of nut crackers, if desired. The holder 20 also includes a plurality of outer smaller apertures 28 for receiving the working end portions of nut picks, also indicated in broken lines, which are held in an upright position by the restricting annular shoulders 30 at the top of the apertures 28 for engaging the shank portions of the nut picks.

As will be apparent, particularly from FIG. 3, the nut tools are normally firmly supported in upright or vertical position and are readily removable from their holding apertures for use when desired.

It is to be understood that the present invention is not confined to the particular construction and arrangement of parts herein illustrated and described but embraces all such modifications thereof as may come within the scope of the following claims.

I claim:

1. A nut tool rack for removable attachment to a receptacle having an outwardly extending rim portion, which comprises:
    a cross arm;
    a reversely bent section at the outer end portion of said cross arm;
    said reversely bent section having a substantially flat planar inner surface for engaging an outer surface of said rim portion;
    nut tool supporting means carried by the inner end portion of said arm and extending outwardly from the sides of said arm; and
    depending leg means carried by said arm extending angularly downward therefrom outwardly toward said end portion of said arm and engagable with an inner surface portion of said receptacle for supporting the rack transversely of said receptacle.

2. The combination of the rack of claim 1 with a receptacle.

3. The rack of claim 1 wherein the nut tool supporting means carried by the inner end portion of said arm comprises upright apertures in said supporting means.

4. The rack of claim 3 wherein the upright apertures are of varying diameters selectively to receive the handle ends of a nut cracker and the shank ends of a nut pick.

5. The rack of claim 4 wherein restricting shoulders are provided at the bottom end portions of the apertures for receiving the handle ends of a nut cracker.

6. The rack of claim 4 wherein restricting shoulders are provided at the top end portions of the apertures for receiving the shank ends of a nut pick.

7. The combination of the rack of claim 3 with a receptacle.